Sept. 22, 1936.  E. E. HEWITT ET AL  2,055,104
PISTON PACKING
Filed Oct. 4, 1933    2 Sheets-Sheet 2
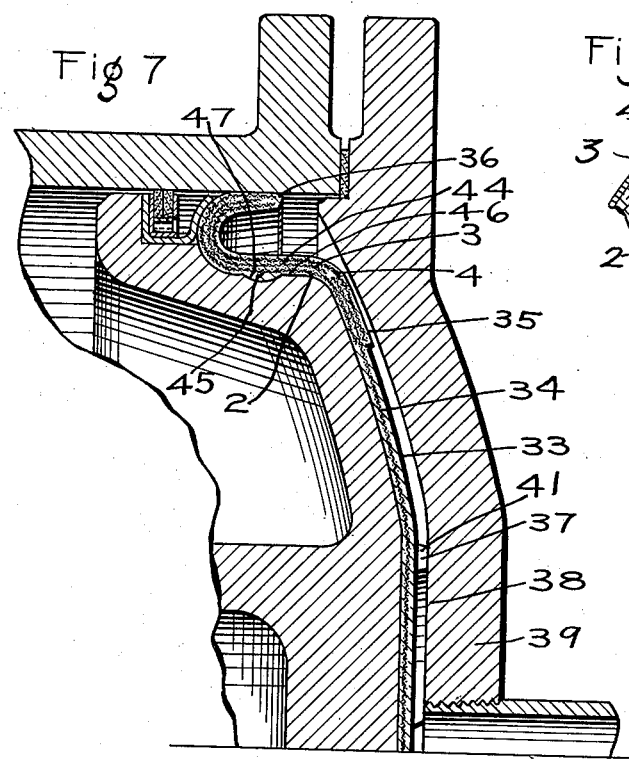
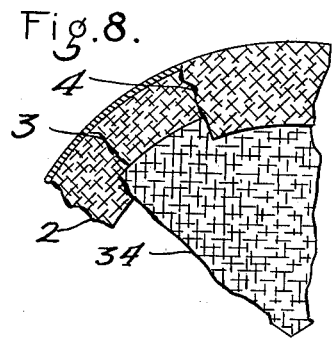
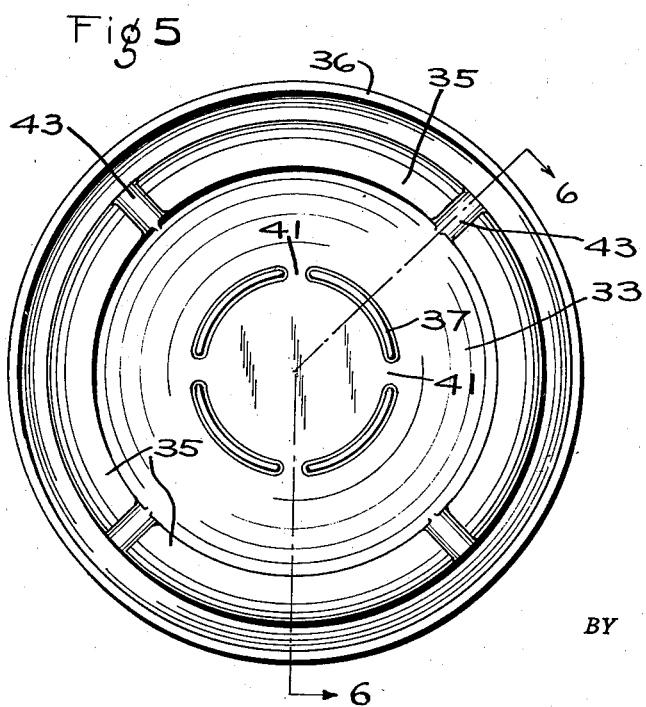
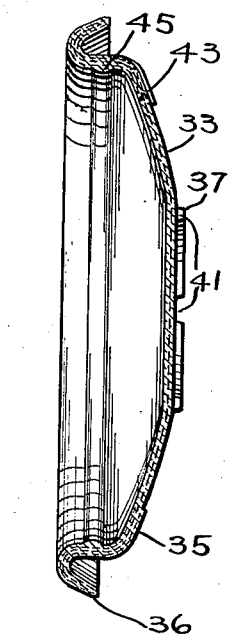
INVENTORS
ELLIS E. HEWITT
WILLIAM C. LANDIS
BY Wm. M. Cady
ATTORNEY Patented Sept. 22, 1936

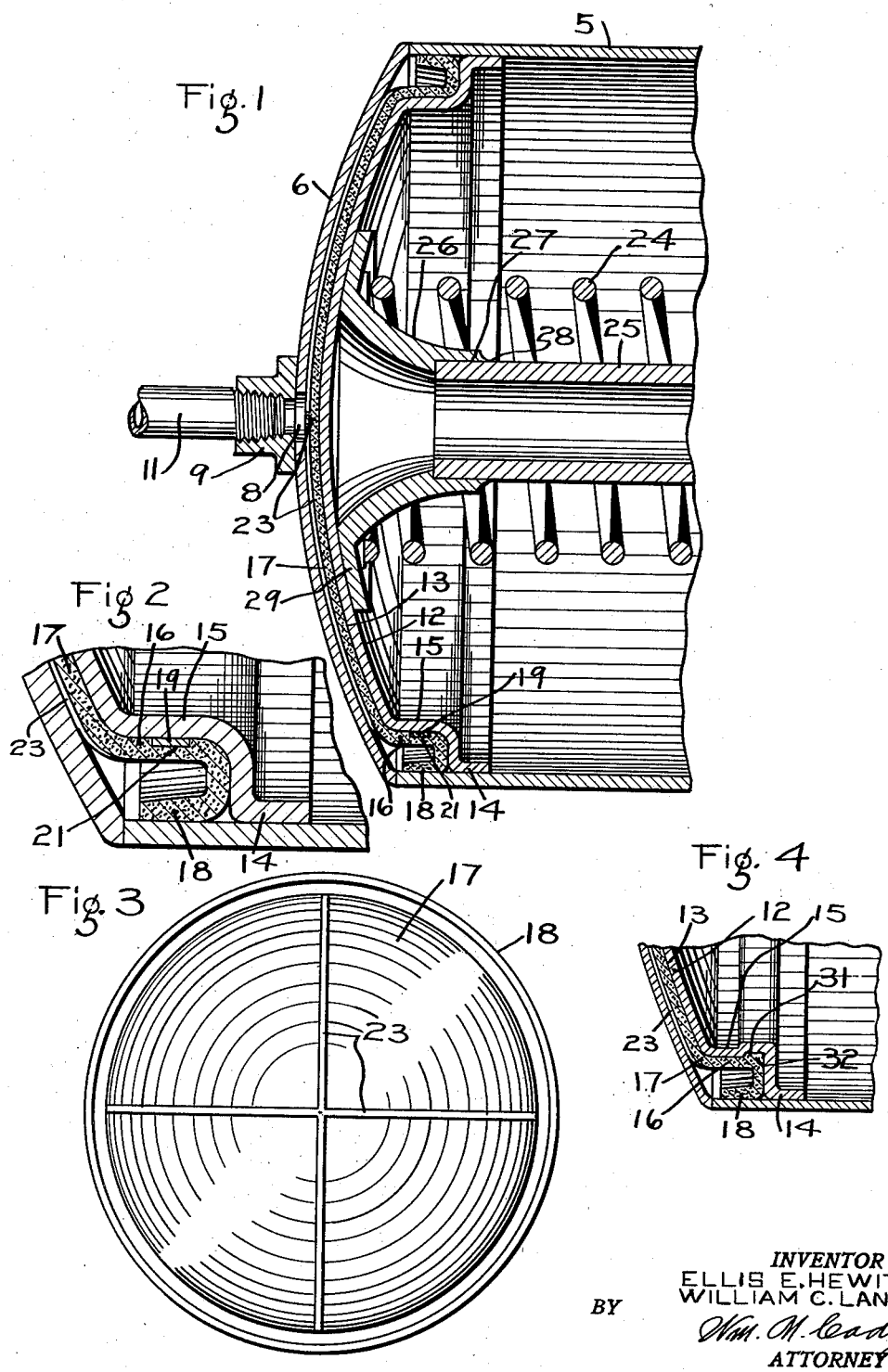

2,055,104

UNITED STATES PATENT OFFICE 2,055,104

PISTON PACKING

Ellis E. Hewitt, Edgewood, and William C. Landis, Pittsburgh, Pa.

Application October 4, 1933, Serial No. 692,099

9 Claims. (Cl. 309—33)

This invention relates to piston packings and particularly to packings for brake cylinders and pistons employed in the operation of fluid pressure brakes, and is a continuation in part of our copending application, Serial No. 581,168, filed December 15, 1931, and assigned to the assignee of this application.

The usual packings for the pistons used in brake cylinders of fluid pressure brake equipment are annular and are carried by pistons provided with relatively large and heavy follower plates adapted for securing the annular packing to the piston. Heavy follower plates were required in order to securely fasten such annular packings to the piston and to prevent leakage through the usual center opening therein and around the bolt holes. Frequently leakage occurs at the places mentioned regardless of precautions taken to prevent it.

It is an object of this invention to provide an imperforate piston packing that completely covers the piston and wherein the marginal sealing lip of the packing comprises a wall of an annular corrugation that is placed under compressions, so that the sealing lip is constantly biased into engagement with the cylinder wall when the packing is assembled upon the piston and confined within the cylinder, thereby rendering it capable of effectively sealing the piston regardless of the usual wear of the sealing lip.

A further object of this invention is to provide an imperforate packing for a cylinder and piston construction wherein the piston conforms substantially to the contour of the pressure head of the cylinder, and wherein the packing is self retaining and is secured to the piston without the usual retaining bolts and conforms to the contour of the pressure head, thereby reducing the dead air space between the cylinder head and piston to a minimum and thereby reducing the quantity of active fluid under pressure required to operate the piston. Since there are no bolt holes in the packing disc which completely covers the pressure face of the piston, leakage through the disc is prevented entirely.

A further object of the invention is to provide a piston and resilient packing disc therefor that is frictionally retained on the piston without necessitating the usual cumbersome and expensive follower plate and bolt construction, thereby reducing the weight and number of parts required.

A further object of the invention is to provide an imperforate packing, wherein means are provided for effectively holding the pressure face of the packing out of engagement with the pressure head of the cylinder, so that the fluid under pressure supplied to the cylinder may act immediately on the pressure face of the packing substantially throughout its entire area, and so that adherence of the packing to said pressure head is effectively prevented.

A further object of the invention is to provide an imperforate packing for a brake cylinder piston, wherein the radial pressure with which the sealing lip is forced against the cylinder wall is materially increased due to the improved reinforcement of the sealing lip adjacent the annular corrugation thereof and the relatively great initial flare given the sealing lip, and wherein provision is made for facilitating assembly of the packing within the cylinder.

These and other objects of the invention that will be made apparent throughout the further description thereof, are attained by the cylinder and piston packing hereinafter described and illustrated in the accompanying drawings; wherein Fig. 1 is a longitudinal sectional view through a portion of a cylinder and piston device embodying features of the invention;

Fig. 2 is an enlarged sectional view of a fragment of the device shown in Fig. 1;

Fig. 3 is a plan view of the improved packing shown in Fig. 1;

Fig. 4 is a fragmental sectional view of a modified form of piston and packing disc construction;

Fig. 5 is a plan view of a modified form of piston packing;

Fig. 6 is a sectional view of the packing shown in Fig. 5, taken on the line 6—6 thereof; and Fig. 7 is an enlarged fragmentary sectional view of the packing shown in Figs. 5 and 6, shown in assembled position upon a piston within a brake cylinder.

Fig. 8 is a diagrammatic view showing the relation and disposition of the fabric layers in the packing disc.

Referring to the drawings and particularly to Figs. 1, 2 and 3, the invention comprises a cylinder 5, the pressure head 6 of which is bulged outwardly and is spherical in shape for the purpose of giving it strength and for a purpose that will hereinafter appear. The cylinder head is provided with an opening 8 that registers with a threaded pipe fitting 9 welded to the exterior of the head and which receives the brake cylinder pipe 11.

The piston 12 is pressed from sheet metal into the form of a cup, as shown in Fig. 1, and comprises a central portion 13 having a pressure face similar in contour to that of the inner face of the head 6. The central portion merges into an integral stiffening and guide flange having two cylindrical portions 14 and 15 of different diameters, the portion 14 serving as a guide flange for the piston adapted to slidably engage the cylinder wall, while the portion 15 of less diameter provides a space between it and the cylinder wall in which the folds of an annular corrugation of a packing disc 17 are disposed, and, as will hereinafter appear, serves as a support for one of said folds.

The packing 17 comprises an imperforate disc made of elastic, resilient material such as rubber and is of substantially uniform thickness throughout, and completely covers the pressure face 13 of the piston 12. The disc is provided with an annular corrugation constituting a sealing flange or fold having an inner cylindrical portion 16 which is adapted to be slightly stretched over the cylindrical portion 15 of the piston for causing it to frictionally adhere thereto and an outer peripheral flange or fold 18 which may be considered a reentrant flange which constitutes a sealing lip and which extends toward the pressure face of the piston, the said portions 16 and 18 being integrally joined by the packing material in the form of a U-bend as indicated in Figs. 1, 2 and 3.

The peripheral fold 18 is normally flared outwardly at an angle to the inner fold 16 so that when the packing is inserted within the cylinder, the outer fold 18 must be forced inwardly to the working position best shown in Fig. 2, thereby compressing the material in the outer portion 18 and bending the material in the U-bend. The tendency of the material in the U-bend is to return to its original shape, and therefore the material of the U-bend tends to force the outer fold 18 into sealing contact with the cylinder wall and will continue to exert such force as the material wears and the portion 18 becomes thinner.

Because the packing material is live rubber and is bent through an angle of 180° instead of the usual 90°, and the radius of curvature is relatively large, ample flexibility is provided and the original outward flare of the portion 18 may be relatively great, so that when it is compressed the elastic limit of the material is not exceeded although the force with which the portion 18 is held against the cylinder wall is increased. By reason of this construction greater flexibility is obtained than is possible with the usual cup-shaped packing, and the range through which the flexibility is effective is increased over that of a packing having a free flange that is turned only through the customary 90°.

The force exerted by the material of the U-bend on the outer fold 18 reacts inwardly upon the inner fold 16 and presses that fold firmly against the cylindrical portion 15 of the piston so that it is frictionally secured thereto.

As a further precaution against accidental separation of the packing from the piston, the cylindrical portion 15 of the piston is provided with a tongue, such as an annular bead 19 and the inner surface of the packing fold 16 is provided with a recess, such as an annular groove 21 corresponding in contour to that of the bead so that as the packing is forced onto the piston, the fold 16 is stretched over the bead and when the groove 21 registers therewith, the fold contracts and snaps into interlocked relation upon the piston. Separation of the bead and groove is further prevented by the inward pressure exerted upon the packing fold 16 adjacent the groove by the compressed material of the U-bend.

Since the contour of the outer surface of the packing disc 17 is substantially the same as that of the inner surface of the pressure head 6, the dead air space between the pressure head and the piston is reduced to a minimum, the only unoccupied space being that in the immediate vicinity of the reentrant flange of the packing disc and the slight space that separates the surface of the packing disc and the pressure head maintained by the cross ribs 23 on the outer face of the packing disc, which serve to maintain the major portion of the outer surface of the packing disc out of contact with the pressure head to prevent it from adhering thereto.

Since fluid under pressure is supplied to the cylinder through the pipe 11, and serves to move the piston 12 toward the right, the pressure within the cylinder tends to press the packing disc into engagement with the piston. The piston is returned to the position shown in Fig. 1 by the usual spring 24 and consequently there is no condition in the operation of the piston which tends to remove the packing disc therefrom. The elimination of any retaining bolts obviates the necessity for bolt holes in the packing discs and consequently the construction is inexpensive and more effective for retaining fluid pressure within the cylinders.

The piston rod is made from a piece of commercial steel tubing and is connected to the piston 12 by means of a forged metal conical hub 26, that is provided with a bore 27 for receiving the end of the piston rod 25. The rod is electrowelded to the hub at the point 28 and is provided with a flange 29 that is electro-welded to the piston 12.

It is apparent from the foregoing that in the construction described, the machining operations are reduced to a minimum and that the apparatus is relatively light in weight and inexpensive to manufacture.

Referring to Fig. 4, a modified form of piston construction is disclosed, wherein the cylindrical surface of the piston 12 is provided with a recess, such as an annular indentation or groove 31 that is adapted to receive a tongue, such as an annular bead 32 formed on the inner surface of the cylindrical portion 16 of the packing disc 17. The disc is assembled upon the piston by pressing the cylindrical portion thereof over the cylindrical portion of the piston until the bead 32 enters the groove 31.

The combined cylindrical and spherical shape of the piston increases the strength thereof and renders it capable of withstanding operating stresses without distortion. The piston construction above described is rugged, inexpensive, and is of less weight than the usual piston made of cast iron. The cylinder and piston construction has the further advantage that there is substantially no dead air space between the pressure head 6 and the piston 12.

Referring to Figs. 5, 6 and 7, a modified form of cup-shaped piston packing is disclosed wherein the general structure is similar to that disclosed in Figs. 1 to 4, the difference residing in the reinforcement of the corrugated marginal portion of the packing by embedded fabric, the location and shape of the contact lugs or bosses for holding the packing spaced from the end wall of the brake cylinder, and the chamfering of the sealing lip to facilitate assembly.

The packing disc 33, shown in Figs. 5, 6 and 7, is of substantially uniform thickness throughout, with the exception of the marginal corrugated portion which is reinforced by layers of fabric embedded in the packing. In the present instance three layers 2, 3 and 4 are shown, but as many layers as are found desirable may be employed.

As indicated in Figs. 7 and 8 a circular layer of reinforcing fabric 34 is embedded in the central portion of the packing disc and the annular layers 2 and 4 overlap the marginal portion of the layer 34. The central annular layer 3 butts the marginal edge of the circular layer 34, so that in effect a central layer of reinforcing fabric extends over the entire packing, while two superimposed annular layers add reinforcement to the corrugated marginal portion of the packing. While but one layer of fabric 34 is shown, two or more layers may be provided for reinforcing the central portion of the packing.

The reinforcing fabric employed in building up the packing is made of cotton strands woven with an open mesh providing interstices between the strands through which raw rubber applied to both sides of the fabric under pressure is forced, so that the rubber on opposite sides of the fabric is united by the rubber forced into the interstices. The rubber coating on the fabric disc 34 is thicker than that applied to the annular layers 2, 3 and 4 which originally comprised strips of rubber coated fabric of the character above described, so cut from the sheet that the warp and woof strands are disposed diagonally of the strip.

In building up the blank for molding the packing, the strips of reinforced fabric are formed in the shape of an annular corrugation by winding them on a suitable mandrel or arbor and so that they are joined in the above recited order with the central disc. Because of this arrangement of the fabric strands in the disc, the strands when wound upon the mandrel are all disposed diagonally with respect to the intersecting radii throughout the circumference of the annular corrugation.

In order that the fabric may be properly embedded and surrounded exteriorly with a proper covering of packing material, the thickness of the packing disc is increased opposite the multiple layers of reinforcing fabric, as at 35, so as to provide substantially the same quantity of molded material or rubber compound in the reinforced portion of the disc as is present in any section of the body of the packing.

The reinforcement provides greater strength throughout the marginal corrugated portion of the disc and so stiffens the material in the U-bend section that greater force is required to compress the flared sealing lip into assembled position within the cylinder. Therefore the sealing lip is forced into sealing contact with the cylinder wall with proportionally greater force. The sealing lip will, therefore, follow as it becomes worn and continue to effectively seal the piston even though a considerable portion of the lip has been worn away.

In order to facilitate assembly of the packing within the cylinder, the outer corner of the peripheral edge of the sealing lip is chamfered at 36, so that when the lip is compressed inwardly during assembly operation, the chamfered edge presents a conical surface which may be readily forced into the open end of the cylinder.

The contact lugs or ribs 37 are disposed near the center of the packing and the contact faces are flat and disposed in a plane normal to the longitudinal axis of the packing, so that they squarely engage the flattened portion 38 of the pressure head 39. The pressure head 39 is flattened at 38 to receive the flat faces of the lugs 37, for if the lugs were to engage a spherical surface, there would be a tendency to crowd or jam them toward the center of the packing and thus distort them and also cause stretching of the packing from the corrugated portion of the packing toward the center. The spaces 41 are provided between lugs 37 to permit free passage of air past the lugs toward the periphery of the packing.

It will be observed, that normally the reinforced portion 35 of the packing is held out of contact with the pressure head by the lugs 37 engaging the pressure head, and that fluid under pressure may freely flow to the peripheral sealing lip from the central supply passage 42. However, fluid under pressure will flow to the sealing lip through radial grooves 43 in the portion 35 of increased thickness, in the event that said portion should engage the pressure head of the cylinder due to wear of the lugs 37 or excessive compression thereof.

To insure against accidental displacement of the packing from the piston during removal of the piston from the cylinder for inspection or repair, the interior face of the wall 44 of the corrugation is provided with an annular bead 45 which is expanded over the cylindrical portion 46 of the piston during assembly and snapped into an annular groove 47 in said portion of the piston. The bead also prevents foreign substances in the non-pressure end of the brake cylinder from working under the packing and lodging between the packing and the piston.

While we have disclosed several embodiments of the invention, it is obvious that alterations, omissions and additions may be made in the construction without departing from the spirit of the invention.

Having now described our invention, what we claim as new and desire to secure by Letters Patent, is:

1. In combination, a cylinder, a piston for operating in said cylinder, and a packing for said piston, said packing comprising a disc-like body portion and, integral with said body portion, a peripheral portion including an annular corrugation having substantially cylindrical, spaced, concentric lip and base portions joined by continuously curved portion free to act resiliently throughout its length, the piston having a shoulder provided with a recess and the base portion of said corrugation having a projection formed thereon adapted to cooperate with the recess on the piston to secure the packing to the piston, and the lip portion of said corrugation being adapted to be displaced toward the base portion, by the cylinder, in the working condition of the packing, said curved portion being thereby tensioned throughout its length for simultaneously resiliently urging the lip portion of the corrugation into sealing contact with the cylinder and the base portion of the corrugation into gripping engagement with the piston to aid in maintaining the projection on the packing in cooperative relation with the recess on the piston.

2. A piston packing having a central portion and an annular marginal portion constituting a resilient sealing lip, the said central portion having a sheet of reinforcing fabric embedded therein throughout and the said marginal portion having a plurality of spaced sheets of reinforcing fabric embedded therein and overlapping the fabric in the central portion on both sides.

3. A piston packing disc made of resilient, flexible material having a central portion and a marginal portion including an annular corrugation constituting a resilient sealing lip, the said marginal portion being of increased thickness adjacent the central portion and provided thereat with spaced channels for preventing said portion of increased thickness from forming a fluid seal in the event that it engages a cylinder head.

4. A piston packing disc made of resilient, flexible material having a central portion and a marginal portion including an annular corrugation constituting a resilient sealing lip, the said marginal portion being of increased thickness and projecting beyond the surface of the pressure face of the central portion of the disc adjacent thereto, and the central portion having spacing lugs projecting beyond the pressure face of the central portion a greater distance than the projecting portion of the marginal portion adjacent the central portion so as to engage the cylinder head and hold the said marginal portion of increased thickness adjacent the central portion out of contact with said cylinder head.

5. A molded disc-like packing comprising an imperforate central portion and a peripheral portion having an annular corrugation, the central portion comprising one layer of packing material having rubber composition on opposite sides of a woven fabric, and the peripheral portion comprising a plurality of layers of packing material, each layer comprising rubber composition on opposite sides of a woven fabric, the warp and woof strands of the last said fabric being disposed diagonally with respect to intersecting radii throughout the circumference of said peripheral portion and the last said layers of packing material being so disposed with respect to said layer constituting said central portion as to overlap the margin thereof.

6. A molded piston packing comprising a central portion and a peripheral sealing lip portion, the central portion comprising one layer of packing material having rubber composition on opposite sides of a woven fabric, and the peripheral portion comprising a plurality of integrally joined layers of packing material, each layer comprising rubber composition on opposite sides of a woven fabric, one of the layers of the peripheral portion abutting the periphery of the central portion and others of the layers of the peripheral portion overlapping the periphery of the central portion on opposite sides thereof.

7. In combination, a cylinder, a piston having a peripheral guide portion and a substantially cylindrical shoulder formed on the pressure face thereof of lesser diameter than the guide portion, and an imperforate resilient packing disc adapted to cover the pressure face of the piston, said packing disc having an annular corrugation therein comprising substantially cylindrical spaced concentric lip and base portions joined by a resilient connecting portion, the lip portion of the corrugation constituting a cylinder-engaging sealing lip and the base portion of the corrugation being adapted to fit over the cylindrical shoulder on said piston, said base portion of the corrugation and the shoulder of the piston having a tongue and groove thereon adapted to be yieldingly maintained in cooperative relation to secure the packing to the piston, by the tension created in the connecting portion of the corrugation on the packing disc due to relative displacement of the lip and base portions of the corrugation in the working condition of the packing.

8. In combination, a cylinder, a piston having a peripheral guide portion and a shoulder formed on the pressure face thereof having an annular groove therein, and an imperforate resilient packing disc adapted to cover the pressure face of the piston, said packing disc having at the periphery thereof a reentrant flange comprising a cylinder-engaging sealing lip portion and a base portion joined together by a resilient connecting portion, said base portion having an annular rib thereon adapted to snap into the groove on said piston shoulder to secure the packing to the piston, the annular rib on said base portion and the groove on the piston shoulder being further yieldingly maintained in cooperative securing relation upon the tensioning of the connecting portion of the reentrant flange, due to relative displacement of the lip and base portions of the flange in the working condition of the packing disc.

9. In combination, a cylinder, a piston for operating in the cylinder and having a peripheral guide surface thereon and an annular shoulder on the pressure face thereof spaced radially inwardly from the guide surface and having an annular groove therein; and an imperforate packing for said piston, said packing comprising a central imperforate portion and a peripheral portion of U-shaped cross-section, the peripheral portion comprising a substantially cylindrical base portion integrally joined at one end to the peripheral edge of the central portion and fitting over the shoulder on the piston, an annular rib on the base portion which snaps into the groove in the shoulder on the piston when the base portion is fitted over the shoulder on the piston for holding the packing on the piston, an annular sealing lip disposed in spaced concentric relation to the base portion and outwardly divergent from the base portion in the free condition of the packing, and an annular portion of continuously curved cross-section integrally joining the free end of the base portion and the smaller end of the sealing lip, said cross-sectionally curved portion being resiliently tensioned in bending, along the entire length thereof, when the outer free end of the sealing lip is bent inwardly toward the base portion into the working position thereof, the bending tension of the curved portion being effective to urge the sealing lip outwardly into sealing contact with the cylinder and the base portion inwardly into gripping relation with the shoulder on the piston to aid in maintaining the rib on the base portion in cooperative relation with the groove in the shoulder on the piston and thus assist in preventing separation of the piston and packing.

ELLIS E. HEWITT.
WILLIAM C. LANDIS.